US008446360B2

(12) United States Patent
Baskett et al.

(10) Patent No.: US 8,446,360 B2
(45) Date of Patent: May 21, 2013

(54) FORCE SENSOR FOR USE IN AN INPUT DEVICE AND METHODS FOR CONSTRUCTING AND USING THE SENSOR

(75) Inventors: Lawrence Jared Baskett, Cupertino, CA (US); David Thomas Amm, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 809 days.

(21) Appl. No.: 12/353,732

(22) Filed: Jan. 14, 2009

(65) Prior Publication Data

US 2010/0082270 A1    Apr. 1, 2010

(51) Int. Cl.
*G09G 5/00*    (2006.01)

(52) U.S. Cl.
USPC ........................................ 345/156

(58) Field of Classification Search
USPC ....... 345/156–175; 178/18.03, 18.06; 702/41, 702/190; 73/862.632
See application file for complete search history.

(56) References Cited

U.S. PATENT DOCUMENTS

| | | | |
|---|---|---|---|
| 4,787,051 A | 11/1988 | Olson | |
| 4,839,838 A | 6/1989 | LaBiche et al. | |
| 5,583,541 A | 12/1996 | Solhjell | |
| 5,714,694 A * | 2/1998 | Diessner | 73/862.632 |
| 5,825,350 A | 10/1998 | Case, Jr. et al. | |
| 5,835,077 A | 11/1998 | Dao et al. | |
| 5,854,625 A * | 12/1998 | Frisch et al. | 345/173 |
| 6,040,821 A | 3/2000 | Franz et al. | |
| 6,292,174 B1 | 9/2001 | Mallett et al. | |
| 6,515,651 B1 | 2/2003 | Berstis | |
| 7,061,469 B2 | 6/2006 | Suprun et al. | |
| 7,489,298 B2 | 2/2009 | Liberty et al. | |
| 7,688,307 B1 | 3/2010 | Tsyrganovich | |
| 2003/0214486 A1 * | 11/2003 | Roberts | 345/173 |
| 2004/0008188 A1 | 1/2004 | Liu et al. | |
| 2004/0080494 A1 | 4/2004 | Fahlman | |
| 2004/0217941 A1 | 11/2004 | Chen | |
| 2005/0024332 A1 | 2/2005 | Chen | |
| 2005/0104853 A1 | 5/2005 | Sitalasai et al. | |
| 2006/0125781 A1 * | 6/2006 | Sachs et al. | 345/156 |
| 2006/0164393 A1 | 7/2006 | Wu et al. | |
| 2007/0079155 A1 | 4/2007 | Liao et al. | |
| 2007/0107068 A1 | 5/2007 | Kelley et al. | |
| 2009/0012725 A1 * | 1/2009 | Vaananen | 702/41 |
| 2010/0082286 A1 | 4/2010 | Leung | |

OTHER PUBLICATIONS

"U.S. Appl. No. 12/242,343, Response filed Feb. 13, 2012 to Final Office Action mailed Oct. 13, 2011", 11 pgs.
"U.S. Appl. No. 12/242,343, Response filed Aug. 31, 2011 to Non Final Office Action mailed Jul. 20, 2011", 22 pgs.
"U.S. Appl. No. 12/242,343, Final Office Action mailed Oct. 13, 2011", 12 pgs.
"U.S. Appl. No. 12/242,343, Non Final Office Action mailed Jul. 20, 2011", 26 pgs.

* cited by examiner

*Primary Examiner* — William L Boddie
*Assistant Examiner* — Carolyn R Edwards
(74) *Attorney, Agent, or Firm* — Dorsey & Whitney LLP

(57) ABSTRACT

The disclosure addresses a force sensor that is scalable in size and adaptable to a variety of form factors, including those suitable for use in an input device for a computer or other processing system, and in some cases including those of the configuration normally referred to as a computer mouse. The force sensor will include at least two structural members that are cooperatively attached one another as to be displaced from one another in response to a force acting upon one of the structural members. In some examples, the engagement between the two structural members will be specifically configured to allow such displacement in response to forces acting laterally on the force sensor. The force sensor will also include one or more sensing mechanisms to provide a measurement of the sensed deflection.

20 Claims, 5 Drawing Sheets

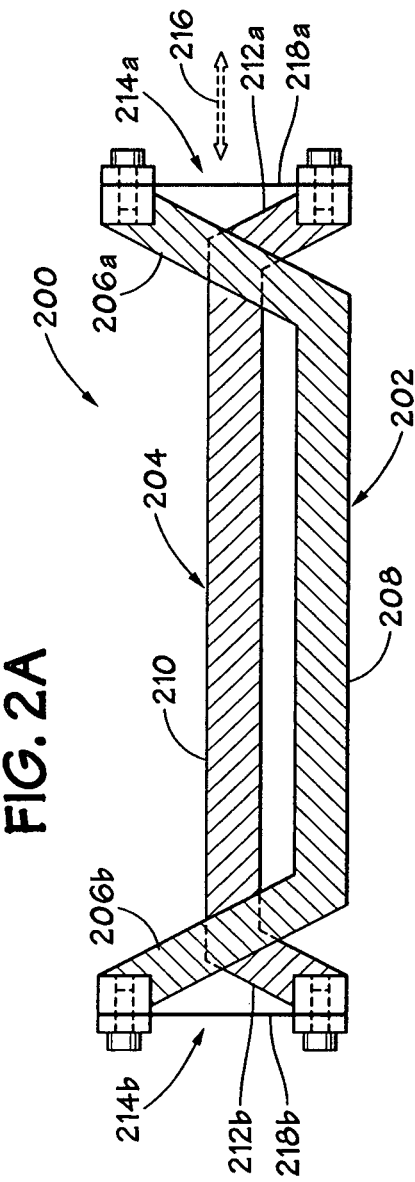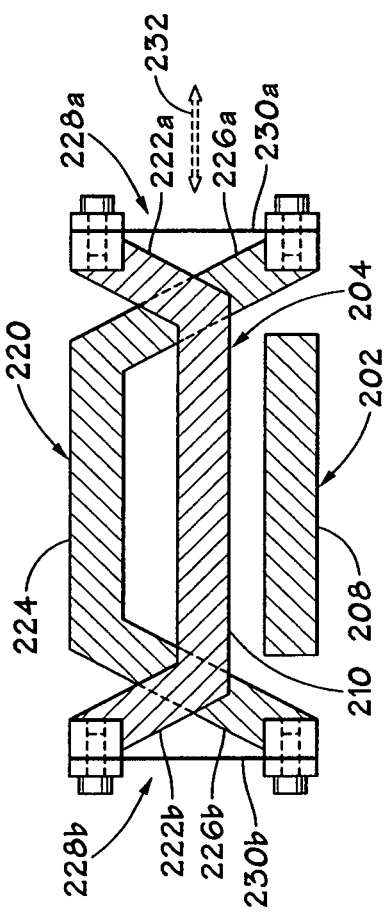

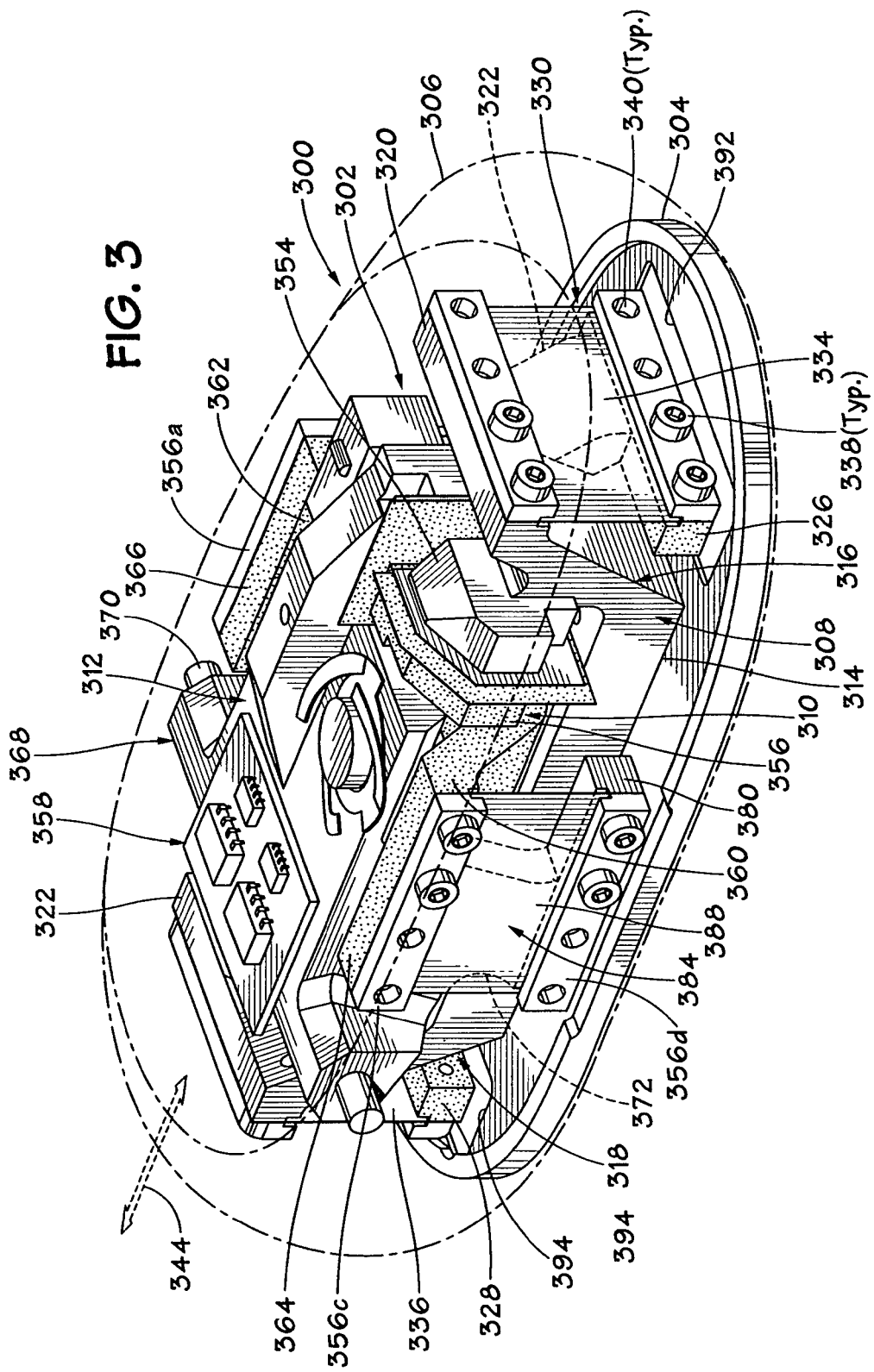

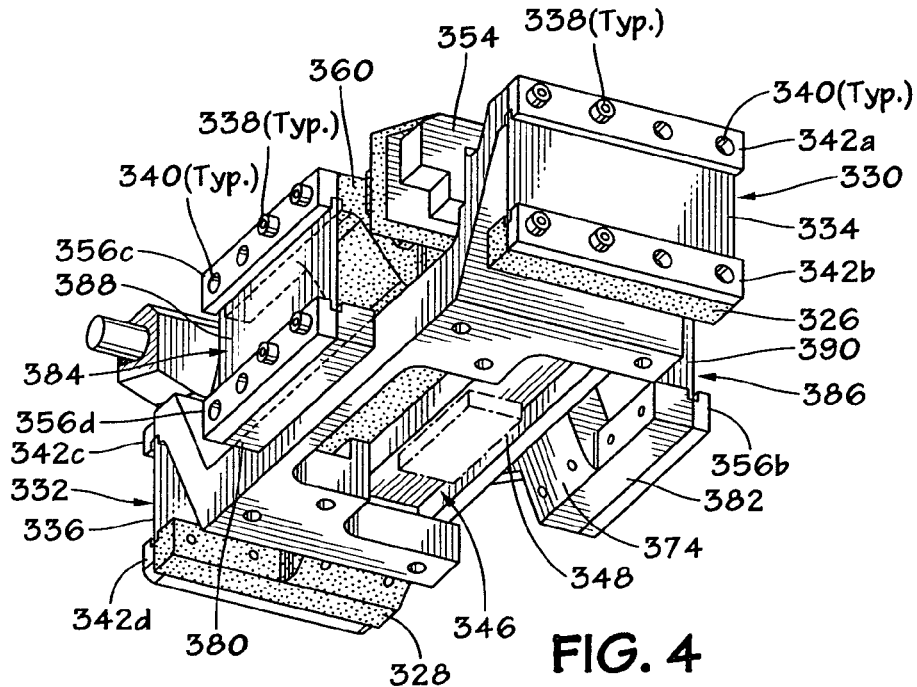

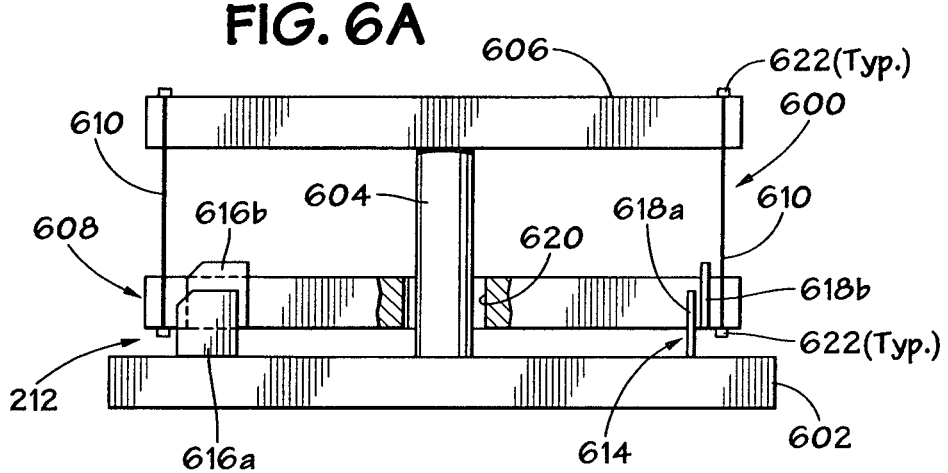
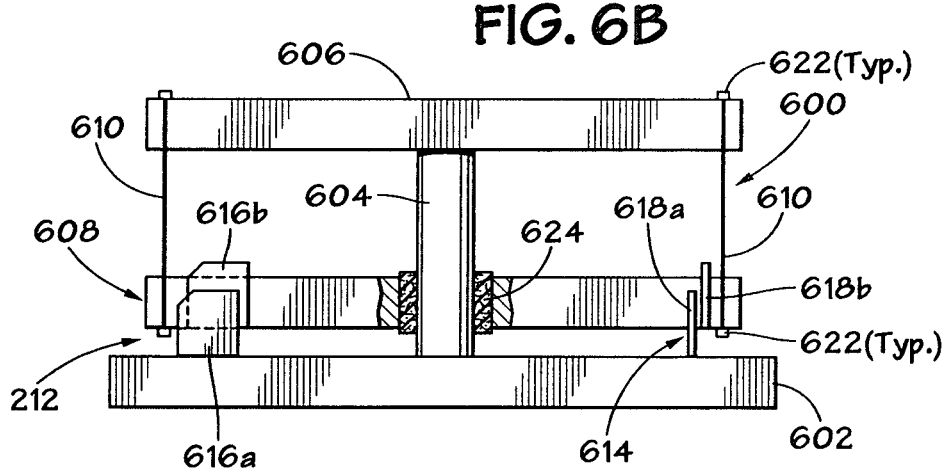
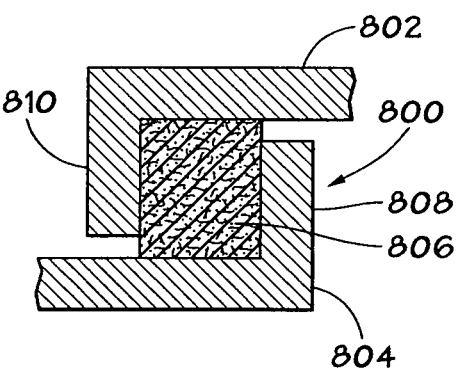

FORCE SENSOR FOR USE IN AN INPUT DEVICE AND METHODS FOR CONSTRUCTING AND USING THE SENSOR

BACKGROUND OF THE INVENTION

The present invention relates generally to force sensors, and more specifically relates to improved force sensors sized and configured to be suitable for inclusion in a hand-held device, and to methods for constructing such input devices; and further to methods for sensing deflection in an input device as an indicator of direction of movement of the input device.

Input devices for computers and other processing systems, such as those typically referred to individually as a computer "mouse," are well-known for use to provide data used to incrementally move an indicator such as a cursor on a display, to control the processing system. Many such "mice" operate through direct communication with an external surface. Well-known examples of such mice include various devices that operate through physical contact of a caged ball rolling on a support surface to provide an indication of movement through detection of the movement by orthogonally-arranged sensors detecting relative X-Y directional components of the ball movement, as it rolls in any direction relative to the surface. Similarly, mice are well-known which utilize an optical sensor to detect movement of the device relative to a support surface.

Input devices such as a computer mouse have recently been proposed by persons employed by the assignee of the present application, that function in the absence of the described physical or optical interaction with a support surface. These recently-proposed input devices operate using other types of sensors, as will be described in more detail later herein, without the need for such mechanical contact or optical elements. One example of such an input device is described in U.S. application Ser. No. 12/242,343, filed Sep. 30, 2008, and entitled "Method And Apparatus For Operating An Input Device," the specification of which is hereby incorporated herein by reference for all purposes. These recently-proposed input devices maybe in the form of conventional devices such as those normally thought of as " mice." However, these input devices may also be of such other configurations as may be desired in any particular context to provide directional and/or positional input.

One example of such an input device utilizes a force sensor assembly to detect lateral force applied to the input device, such as by a user. This force detection is preferably made relative to at least two intersecting axes to provide resolution of the direction of movement in a single plane, i.e., relative to a supporting surface. In these recently-proposed input devices, a second sensor assembly is used to provide a measure of the speed of the movement. In some examples, a vibration sensor is used to provide this speed measure. Thus the two sensor assemblies together provide measures of the direction and speed of movement of the input device that can be combined to provide positioning data based on the movement of the mouse.

In these recently-proposed devices, although virtually any type of force sensor able to detect loading applied relative to at least two different axes could be utilized, optimal performance is believed to be best obtained by a force sensor constructed to withstand the rigors of use over an extended time period, and by potentially by multiple persons with a wide range of operating tendencies. While at the same time, the force sensor will preferably fit within a conventionally-sized input device form factor, and is preferably a device that may be relatively straightforward to manufacture without undue expense.

SUMMARY OF THE INVENTION

The present invention includes a force sensor adaptable to a variety of input device form factors, and particularly to form factors for hand held use. For the examples described herein, the input device will be a computer mouse, and thus the described force sensor is one sized and configured for use within a spatial envelope suitable for that type of hand-operated input device. The present invention, in part, provides a force sensor configured to provide signals representative of relative displacement between two components of the input device.

In one example of the invention, the inventive input device will include at least two structural members, such as external housing members forming the outer "shell" of a mouse that may be assembled to provide a unit wherein the two structural members form a single unit, although one in which the two structural members may be displaced a small dimension relative to one another, such displacement being possible relative to at least two intersecting axes. In one example, the force sensor will be constructed as a discrete assembly that may be mounted to engage both structural members (such as the example housing components) and to provide signals relative to any displacement between the structural members.

In one embodiment of force sensor as will be described herein, the force sensor will include a plurality of frame members held in general relation proximate one another, but with relative displacement allowed by flexure elements extending between the frame members. One or more of the frames will carry force or position sensors arranged to detect the above-described displacements when they occur. In some examples, these position sensors will include capacitance sensors providing varying signals in response to varying proximity between two plates in spaced relation to one another. More details on these examples, as well as on additional structural and operational variations that may be implemented in various examples of the inventive subject matter are provided in the description that follows.

BRIEF DESCRIPTION OF THE DRAWINGS

FIGS. 2A-B depicts a schematic representation of one example of a force sensor as will be described herein, depicted in only a partial view in FIG. 2A; and depicted in a complete view and rotated 90 degrees in FIG. 2B.

FIG. 3 depicts an example configuration for an input device for processing system, and including a force sensor in one example configuration.

FIG. 4 depicts the force sensor from the input device of FIG. 3, depicted from a lower elevation perspective.

FIG. 5 depicts the force sensor from the input device of FIG. 3, depicted from an aerial perspective.

FIGS. 6A-B depict an alternate configuration for a force sensor in accordance with the present invention, depicted in FIG. 6A from a side view, and partially in vertical section; and in a further alternative configuration in FIG. 6B.

FIG. 8 depicts an isolated view of an alternative configuration for forming a flexible connection between structural members of a force sensor in accordance with the present invention.

DETAILED DESCRIPTION OF PREFERRED EMBODIMENTS

The following detailed description refers to the accompanying drawings that depict various details of examples selected to show how the present invention may be practiced. The discussion addresses various examples of the inventive subject matter at least partially in reference to these drawings, and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present invention can include a variety of combinations and/or integrations of the embodiments and examples described herein, as well as further embodiments and examples as defined within the scope of all claims based on this disclosure, as well as all legal equivalents of such claims.

For the purposes of this specification, a "processor-based system" or "processing system" includes a system using one or more processors, microcontrollers and/or digital signal processors or other devices having the capability of running a "program," (all such devices being referred to herein as a "processor"). A "program" is any set of executable machine code instructions, and as used herein, includes user-level applications as well as system-directed applications or daemons. Examples of processing systems include communication and electronic devices such as cell phones, music and multi-media players, and Personal Digital Assistants (PDA); as well as computers, or "computing devices" of all forms (desktops, laptops, servers, palmtops, workstations, etc.).

Figure 1:
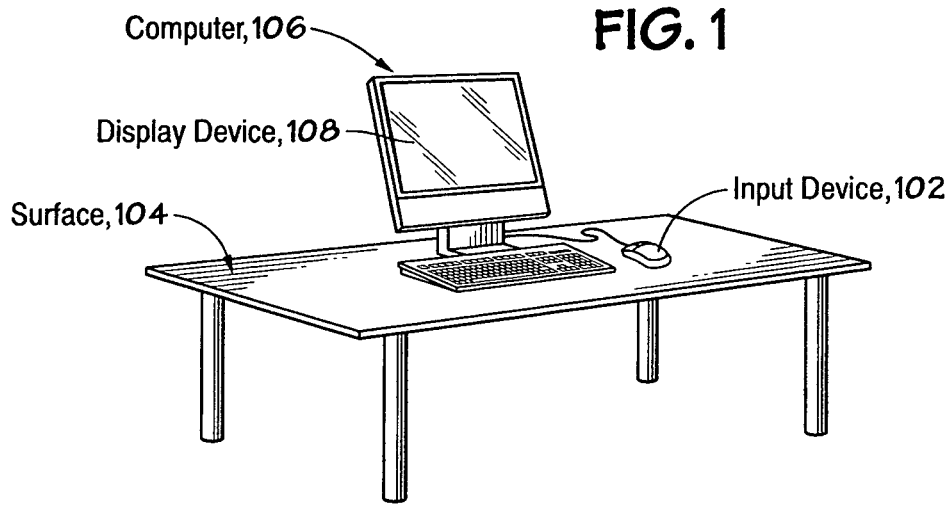
FIG. 1 depicts a representation of an input device in association with a computer in one common operating environment and configuration.

Referring now to FIG. 1, therein is depicted an input device 102 as one example of many possible configurations that may be used to implement the present invention. Input device 102 is connected to a processing system, in this example, a desktop computer 106 having a display device 108 associated therewith, in one example of an operative configuration. Input device 102 and computer 106 are both supported by a surface 104, depicted here as a tabletop. In this example, input device 102 is a computer mouse that will determine positioning information (including direction and speed of movement information) primarily in response to sliding movement of input device 102 relative to supporting surface 104.

Referring now to FIGS. 2A-B, the figures schematically depict, in highly idealized representation, one example of a force sensor 200 in accordance with the present invention. This idealized schematic representation is used to illustrate the fundamental principles of construction and operation of one example configuration to be described in more detail later herein. Referring now particularly to FIG. 2A, the figure shows a schematic representation of a first frame member 202 and a second frame member 204. Frame member 202 includes a pair of angled arms 206a, 206b, where each arm 206a, 206b is inclined generally upwardly relative to a respective opposing end of a central web portion 208. Similarly, second frame member 204 includes a central web portion 210 positioned generally above central web portion 208 of first frame member 202. Second frame member 204 includes a pair of angled arms 212a, 212b inclined generally downwardly from respective opposing ends of central web portion 210.

First and second frame members 202, 204 are coupled to one another by mechanism that allows relative deflection (or movement) between the two frame members. In this example, that movement is generally restrained to be primarily along a single axis. However, configurations where movement is facilitated relative to multiple axes are contemplated. In various configurations, this deflection mechanism may be in the form of either a coupling material or a mechanical assembly coupling the two members. The deflection mechanism may include either a single assembly or a plurality of assemblies. In the depicted example of FIG. 2A, the deflection mechanism is provided by first and second flexure assemblies 214a, 214b coupled between proximate pairs of angled arms 206a, 212a and 206b, 212b of first and second frame members 202, 204.

Flexure assemblies 214a, 214b may be formed of a variety of materials and conformations so long as they allow deflection within a limited range between the two frame members 202, 204. For example, the deflection within a force sensor such as that suitable for use within a computer mouse will preferably be deflection of less than 1 mm, and more preferably within the range of 0.1 to 0.5 mm; and in some examples, less than approximately 0.1 mm. In most use situations, the mouse will be exposed to loads of less than about 250 grams. Many possible configurations may be envisioned for flexure assemblies 214a, 214b. For example, flexure assemblies 214a, 214b could be formed of a material that would be generally solid, but be sufficiently deformable to allow the described deflection. As just one example of such material, a flexible elastomer, such as a silicon-based elastomer could be used.

In the example of FIG. 2A, the described configuration of first and second frame members 202, 204 is specifically suited for use with a generally rigid but flexible element in each flexure assembly 214a, 214b. For example, flexible elements formed of various suitable plastics, metals or other compounds can be used to form, in essence, a spring extending between the two frame members 202, 204. In one example of the invention, as will be described in more detail later herein, each flexure assembly will include a flexible member 218a, 218b of this type, formed of a flexible metal band. One advantage of using a flexible member 218a, 218b such as a metal band is that when such a structure is supported across its upper and lower surfaces, then the member is typically flexible generally along an axis extending laterally and generally in parallel to the support locations; and thus in such a structure each flexible member allows relative movement primarily along an axis extending perpendicular to that to that flex axis, as depicted generally at 216. In the embodiment depicted in FIG. 2A, the flexible members 218a, 218b are generally planar and generally parallel in a vertical orientation when in an "at rest" orientation, and thus the axis of movement extends generally perpendicular to not only the flex axis but also to the plane of the material when in the "at rest" position. It should be readily understood however that the flexible members 218a, 218b are not required to be either vertical or parallel to one another.

Referring now to FIG. 2B, the figure schematically depicts the assembly of FIG. 2A, rotated 90 degrees, and as viewed through a partial vertical cross-section, and with a third support member 220 added to assembly 200 of that figure. The depiction is of a vertical slice only, and for clarity no attempt is made to show surfaces that would be visible in the background in a true vertical section. This view thus depicts that second support member 204 also includes a second pair of angled arms 222a, 222b extending generally upwardly relative to central web portion 210. Thus, second support member 204 includes a first pair of arms 212a, 212b extending generally downwardly to a first side of central web portion 210 (shown in FIG. 2A), and a second pair of arms 222a, 222b extending generally upwardly to a second side of central web portion 210. As is apparent from FIGS. 2A-B, the terms "upwardly" and "downwardly" are not intended to suggest truly opposite, or 180 degree offset orientation; but only to designate the relative orientation relative to the central web portion of the support member in question.

The newly-depicted third support member 220, as with first and second support members, again includes a central web portion 224 and a pair of angled arms 226a, 226b extending from respective ends of central web portion 224. In this example, the arms extend generally downwardly or below central web portion 224. As previously described relative to FIG. 2A, a pair of flexure assemblies 228a, 228b are coupled between proximate pairs of angled arms 222a, 226a and 222b, 226b of second and third frame members 204, 220. Flexure assemblies 228a, 228b may be constructed similarly to first and second flexure assemblies 214a, 214b, as described above. However, such similar construction is not required. Where each flexure assembly 228a, 228b includes a flexible member 230a, 230b similar to those described in reference to FIG. 2A, then the permitted deflection between second support member 204 and third support member 220 will be generally along axis 232 which extends generally perpendicular to axis 216, the axis of the permitted deflection between first support member 202 and second support member 204.

Thus, as is apparent from the above discussion, FIGS. 2A-B schematically depicted a stacked structure in which deflection of each adjacent pair of support members is restricted primarily to one of two orthogonal axes. It should also be apparent that the stacked structure could include additional support members such that the deflection in either direction could be permitted by a completely independent structure rather than through the shared structure in which second support member 204 is coupled to both the lowermost first support member 202 and the uppermost second support member 220. However, the shared structure, as depicted, is believed to offer some advantages, such as requiring reduced vertical space, and is thus preferable for applications where vertical dimension is a possible consideration.

The above-described idealized schematic representation identifies the fundamental structural principles utilized in the device depicted in FIG. 3, discussed below. The above-described schematic representation does not identify any sensors or components thereof to provide signals representative of any translational displacement that occurs between support members connected through flexure assemblies. As will be identified in the discussion of FIG. 3, components of such sensors will preferably be attached to the interconnected support members.

Referring now to FIG. 3, the figure depicts a mouse assembly indicated generally at 300, including a force sensor assembly, indicated generally at 302. Mouse assembly 300 includes two structural members that cooperatively form the external housing of the mouse, lower plate 304 and upper shell 306, depicted in phantom representation. The following description may also be considered in reference to FIGS. 4 and 5, which depict force sensor assembly 302 from opposing elevation perspectives. FIG. 4 depicts force sensor assembly 302 from a lower elevation view, thereby viewing force sensor assembly 302 looking upwardly toward lower-facing surfaces; and FIG. 5 depicts force sensor assembly 302 from an upper elevation view looking generally downwardly, from a side viewing point.

The structural members of force sensor 302 that correspond in general function to the three structural members 202, 204, 220 of FIG. 2, will be referred to in relative positional terms as a "lower wing 308," a "middle wing 310," and an "upper wing 312." The description of these three components in terms of relative position is not intended to suggest that components need necessarily be placed in that same vertical orientation, or in any vertical orientation whatsoever. Similarly the use of the term "wing" is not used to in any way describe or suggest any shape or function to the identified structures beyond that otherwise expressly described, but is used only to provide a nomenclature that improves the clarity of the description in view of the relative complexity of the depicted configurations of the various components in force sensor assembly 302. For clarity in the Figures, middle wing 310, as well as a two capacitor plates carried by the wing (350a, 350b) have been depicted with a surface texture, denoted by stippling of those parts. Such surface texture is not necessarily a desirable feature of the device, but is used solely to assist in distinguishing between the complexly-shaped components assembled in FIGS. 3-5.

Lower wing 308 includes a central web portion 314 with upwardly extending arms, indicated generally at 316 and 318. Lower wing 308, like middle wing 310 and upper wing 312, will preferably be constructed of a material that will be generally rigid under the conditions to which the assembly is subjected. For example, metals, such as cast aluminum, forged steel, or metal injection molded (MIM) steel may be used. However, composite materials, such as for example, a glass-filled plastic, might also be used. As can best be seen in FIG. 5, each arm 316, 318 terminates in a laterally extending upper support bar 320, 322, respectively. Similarly, middle wing 310 includes a first pair of downwardly extending arms, indicated generally at 322 and 324 (see FIG. 5). Each of these middle wing downwardly extending arms 322, 324 terminates in a respective laterally extending lower support bar 326, 328. As adjacent pairs of lower wing arms 316, 318 and middle wing arms 322, 324 cross past one another, laterally extending upper support bars 320, 322 (of lower wing 302) and laterally extending lower support bars 326, 328 (of middle wing 304) are each wider than the respective arm from which they extend. Each pair of proximately adjacent support bars 320 and 326, and 322 and 328 supports a respective flexure assembly, indicated generally at 330 and 332.

Flexure assemblies 330, 332 each preferably include a flexible element coupled between each respective pair of supports to allow a limited degree of translational deflection between the two wings to which the flexure assemblies are attached. Additionally, in some examples as depicted here, it is preferable that each flexure assembly provides some degree of resistance to such translational deflection; and again in some examples, it is preferable that each flexure assembly be capable of providing some degree of relative structural support between the wing members to which it is attached. Accordingly, to depict a device in which these various optional capabilities are implemented, the depicted flexure assemblies 330, 332 comprise a flex band 334, 336 formed of a generally stiff but resilient material. In this example, this material is a metal band formed of spring steel, having a thickness of approximately 0.04 inch; and in this one example, having an area of approximately 0.6 square inch. The use of these metal bands in flexure assemblies 330, 332, as depicted in this example, offers the advantage of facilitating deflection, while avoiding bearings or sliding surfaces that would introduce friction. Force sensors constructed in the manner of the depicted example therefore offer the advantage of sensitivity to movement with minimal hysteresis. Although many mounting systems for flex bands 334, 336 may be envisioned, in the depicted example, flex bands 334, 336 are mounted to each support bar by a mounting bar 342a, 342b, 342c, 342d that engages the exterior surface of each flex band 334, 336 and which is bolted (by a plurality of bolts indicated typically at 338 extending through apertures, indicated typically at 340) to a respective support bar. In this example, recesses 392, 394 have been provided in bottom plate 304 to assure freedom of movement of the lower end of each flex band 334, 336.

As described in reference to FIG. 2, because flex bands 334, 336 are metal, and are supported along their upper and lower surfaces between a respective support bar and mounting bar, there is some resistance to torsional deflection. This construction of flex bands 334, 336 thereby contributes to maintaining a generally fixed lateral alignment between lower wing 308 and middle wing 310, while allowing a generally longitudinal deflection (extending through the longer axis 344 through force sensor assembly 302, as depicted). Also as previously mentioned in reference to FIG. 2, although flex bands 334 and 336 are each disposed in spaced generally parallel and vertical relation, that orientation is a design choice, and other orientations could readily be used, as will be apparent to those skilled in the art.

As can best be seen in FIG. 4, in this example, central web portion 314 of lower wing 308 is not uniformly contiguous, but defines a recess, indicated generally at 346. Recess 346 is provided in this example as a convenient location within which other components may be mounted within mouse assembly 300. For example, another sensor, such as a vibration sensor, indicated in phantom representation at 348, may conveniently be placed within recess 346.

In the example configuration of mouse assembly 300 and force sensor 302, a measurement of deflection between lower wing 308 and middle wing 310, and also between middle wing 310 and upper wing 312, will be made through use of electrical sensors, preferably in the form of capacitance sensors. The visible physical components of each of these capacitance sensors are respective pairs of capacitor plates at 350a, 350b, and at 352a, 352b. Capacitor plates 350a, 350b, are used to provide a measurement that may be used to generate a signal representative of deflection between lower wing 308 and middle wing 310; while capacitor plates 352a, 352b are used to provide a measurement that may be used to generate a signal representative of deflection between middle wing 310 and upper wing 312 (which, as is apparent from the discussion of FIG. 2 will be along a lateral axis extending generally perpendicular to longitudinal axis 344). Accordingly, capacitor plate 350b is mounted on an extension 354 from arm 316 of lower wing 308; while capacitor plate 350a is mounted to a support 356 formed as a portion of middle wing 310. Similarly, capacitor plate 352a is also mounted to support 356 of middle wing 310, but to a surface extending generally perpendicular to that upon which capacitor plate 350a is mounted.

Preferably, when all wings are in an "at rest" position, capacitor plate pairs 350a, 350b and 352a, 352b will be spaced apart a sufficient distance to accommodate the desired range of deflection while providing the necessary resolution of deflection through capacitance change. In a configuration as described herein, with a deflection range of approximately 0.03 inch, a spacing between approximately 0.035 to 0.05 inch may be used, with a spacing of approximately 0.4 inch being preferred. Because the capacitance sensors formed using capacitor plates 350a, 350b will be used to identify a relatively small deflection and to provide a quantitative measurement of that deflection, and because reasonable precision is desired, it can be seen that one plate of each pair of capacitor plates (350b, 352b) is sized smaller than the corresponding plate with which it interacts (350a, 352a). This sizing difference helps to avoid edge effects between the plates that could otherwise diminish the accuracy of the measurements. Capacitor plates 350a, 350b will be in electrical communication with electronic circuitry, as indicated at 358. The electrical configuration of the capacitance sensors may be achieved in a conventional manner, as known to those skilled in the art. Electronic circuitry 358 may also include such processors and other components as may be used to implement some or all of the processing functions described herein, for example, those functions described in reference to the flow chart of FIG. 7.

This description will now further address the connections between middle wing 310 and upper wing 312. In a manner similar to that depicted in reference to the schematic representation of FIG. 2, middle wing 310 further includes a pair of relatively upwardly extending arms 360, 362, which extend generally perpendicular to the direction of downwardly extending arms 322, 324, thereby extending to the relative "sides" of force sensor assembly 302. Again, each arm 360, 362 terminates in a respective support bar 364, 366.

As can be seen from the figures, upper wing 312 preferably extends between the two upwardly extending arms 360, 362 of middle wing 310, and thus extends generally above and along lower wing 308. In this example, upper wing 312 is coupled in laterally movable relation to the wings below it, and in pivoting relation to upper shell 306, such as through a pivot connection 368 between upper wing 312 and upper shell 306. Pivot connection 368 preferably includes a pivot pin 370 that engages apertures in upper wing 312 and surfaces in shell 306 to provide an axis of rotation between those components. As will be apparent to those skilled in the art, this pivoting motion may be used to provide a controlled, vertical range of motion between shell 306 and lower plate 304 of mouse assembly 300, thereby facilitating the well-known "mouse click" movement, with the electrical functionality of the mouse click provided by conventional circuitry within mouse assembly 300.

Upper wing 312 includes a pair of downwardly extending arms 372, 374 that end in generally longitudinally extending supports 380, 382 attached to the lower extent of "lateral" flexure assemblies, indicated generally at 384 and 386. In this example, flexure assemblies 384, 386 are constructed essentially identically to flexure assemblies 330 and 332. Each flexure assembly 384, 386 includes a respective flex band 388, 390 which extends between a respective pair of support bars 360 and 380, and 362 and 382, and is secured thereto by mounting bars 356a, 356b, 356c, 356d. As will be apparent from the discussion above, flexure assemblies 384, 386 will generally resist movement other than along a generally lateral axis extending generally perpendicular to longitudinal axis 344.

Referring now primarily to FIG. 3, therein is shown that when force sensor assembly 302 is assembled within mouse assembly 300, it will be at least partially maintained in orientation within the mouse assembly by engagement between force sensor assembly 302 and lower support plate 304. That engagement may be made through use of screws or any other suitable attachment mechanism.

Additionally, it can be seen that any downward pressure applied to mouse assembly 300 may be applied from the upper shell 306 through the three wings of force sensor 302. The structure described above has each wing coupled to the lower extent of a flexure assembly attached to the wing below it, which in turn, is then attached to the upper extent of the flexure assembly in question. This structure serves to cause downward or compressive force on mouse assembly 300 to be transmitted through force sensor 302 by placing each flexure assembly in tension, rather than compression. This provides increased stability within force sensor 302, and also avoids possible damage that could occur, such as buckling, if the flex assemblies were placed in compression, rather than tension. While the principles described herein may be used with a force sensor in which the flexure assemblies would be placed in compression, the need for structure that can withstand that compression could complicate the design and configuration of those flexure assemblies. Accordingly, in at least some examples of the invention utilizing a flexure assembly including a flex band or other member, as depicted in these Figures, this placing of the flexure assemblies in tension in response to applied force is a desirable feature.

Referring now to FIG. 6A, the figure depicts an example of an alternative design for a force sensor assembly, indicated generally at 600. In contrast to force sensor assembly 302, which generally restricts movement between structural members to either of two perpendicular axes, force sensor assembly 600 allows 360 degrees of movement of a first structural member relative to a second structural member. In force sensor assembly 600, although the movement is allowed to occur freely, the measurement of the movement will be determined through reference to measurements along two axes, such as through capacitance-based position sensors, as discussed previously.

Force sensor 600 includes a support platform 602, serving as a relatively stationary, or reference, structural member. A central pillar 604 extends from support platform 602 and supports an upper platform 606. Upper platform 606 is used to suspend a floating platform 608. Floating platform 608 may be suspended by any sufficiently flexible mechanism that will allow deflection of floating platform 608 relative to support platform 602, preferably through 360 degrees of movement, as discussed above. In one embodiment, a plurality of flexible strands or cables 610 are used as suspension members to suspend floating platform 608. Such strands or cables may be secured in place by enlarged heads or other mechanisms, indicated generally at 622 for terminating such devices. The suspension members may be distributed in any pattern to provide even and flexible support. For example, placement of cables at four corners of a square upper platform 606, or along perpendicular diameter lines of a circular platform, are examples that could be used.

As identified above, force sensor assembly 600 includes a first capacitance sensor indicated generally at 612, and a second capacitance sensor indicated generally at 614 with the capacitance plate sensing pairs 616a, 616b and 618a, 618b, arranged in spaced relation relative to two orthogonal axes to measure deflection relative to the two axes. In this example, a first capacitance plate of each sensor is supported by lower plate 602, and the other capacitance sensor plates 616b, 618b are each supported by floating platform 608. The general structure and operation of capacitance sensors 612 and 614 is otherwise similar to that previously described. As shown in FIG. 6B, a resistance mechanism 624, such as an annular deformable member can be placed within aperture 620 in plate 608 (surrounding support pillar 604 to allow freedom of movement of floating platform 608), so as to provide a resistance within force sensor assembly 600 to the deflection that results from a force acting on floating platform 608. Such a resistance mechanism could be, for example, a silicon rubber sleeve.

As noted above, in some examples of input devices in which a force sensor as described and illustrated herein may be used, such as the computer mouse 300 identified in reference to FIG. 3, the force sensor measurements will be used in combination with a speed measurement to provide an output indicating planar coordinates (X, Y) which may be used in a conventional manner to provide updated coordinates for a cursor relative to pixels on a display screen.

Figure 7:
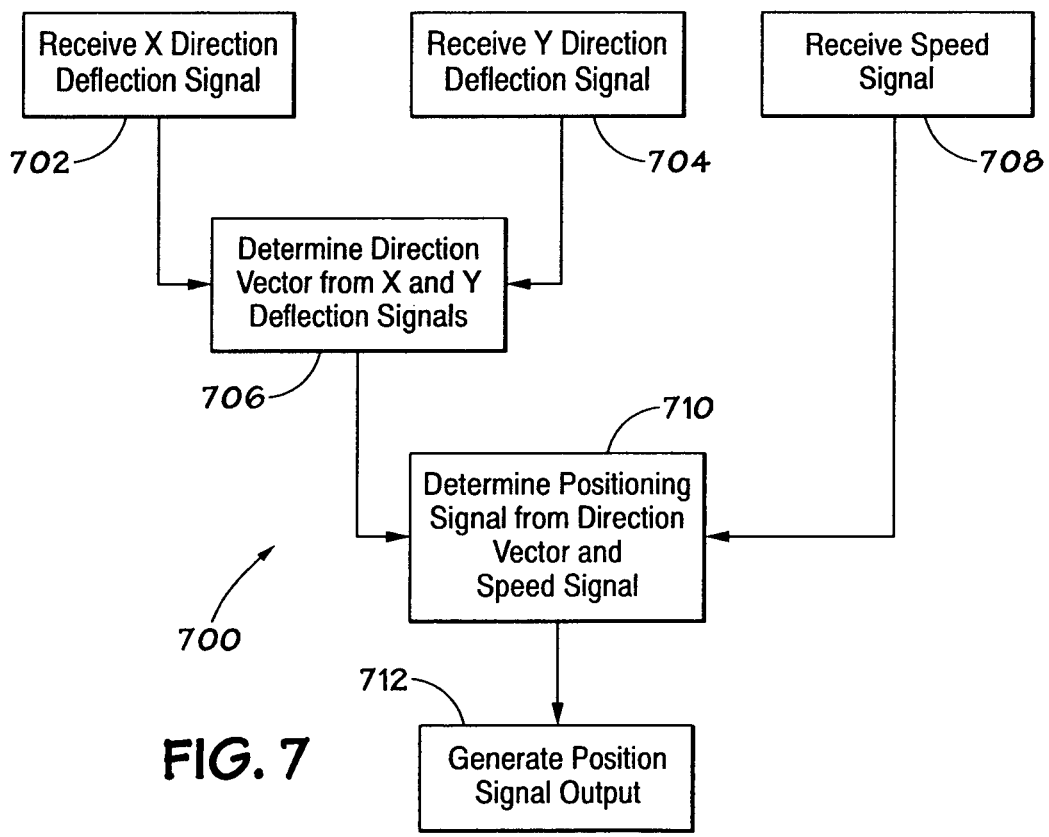
FIG. 7 depicts a flow chart identifying one example of a method for operating an input device utilizing a force sensor in accordance with the present invention.

Referring now to FIG. 7, therein is depicted a flowchart 700 graphically depicting this method of operation of an input device incorporating a force sensor constructed in accordance with the teachings herein. As will be apparent to those skilled in the art, some processing of the signals from such a force sensor, in combination with the signals from at least one other sensor, will be required to provide complete input device functionality. Although conceptually, much of this processing could be done within the processing system to which the input device will be attached, a preferred configuration is to perform at least a portion of the processing through one or more processors within the input device. Accordingly, it should be understood that the below-described method of operation may be performed entirely by processors within the input device, or may be performed, at least in part through a processor within the processing system to which the input device is attached. Each such processor will have appropriate signal inputs, and will include some machine-readable media. In most cases, the processors will also be operatively coupled to additional machine-readable media. Such machine-readable media will preferably be in the form of some form of solid-state memory, as may be formed using electrical, optical or magnetic, or any other type of information storage mechanism, suitable for temporarily or relatively permanently storing information for access by a machine. The term "machine-readable media" as used herein is expressly includes both single and plural instances of any such storage mechanisms. Although those skilled in the art will recognize many possible configurations for devices for performing the processing functionality, one example configuration is seen in FIG. 3, wherein a processing module 358 is depicted. Processing module 358 may be relatively simple, including one or more processors, any external machine-readable media, and any additional required components contained on a printed circuit board, as depicted.

As discussed above, the force sensor will yield at least two, and possibly more, measurements of deflection. Where only two measurements are used, the most straightforward configurations will have those measurements along orthogonally arranged (X-Y) axes. Accordingly, using this simple case, the algorithm begins with receiving the X direction deflection signal 702, and receiving the Y direction deflection signal 704 from the deflection sensors, such as the described capacitance sensors of mouse 300. The act of receiving the signals from the deflection sensors includes any desired processing of those deflection signals. For example, in the case of capacitance measurement signals, it will often be desirable to filter or otherwise smooth the output signals. Additionally, depending upon the desired configuration for performing further operations with the signals, it may be preferable to digitize those signals for further processing. Other types of processing are, of course, possible. After the signals have been received and processed as desired, the signals may be combined in a conventional manner to yield a directional vector 706, the directional vector representing the direction of the lateral, or planar, movement of the input device along the support surface.

As noted earlier herein, the directional information from the force sensor will be combined with another measurement, such as a speed signal, which will be received in the algorithm 708, been processed any further matter desired. One preferred mechanism for generation of that speed signal is a vibration sensor. In such a system, the vibration signal from the sensor may be analyzed, for example to determine the number of signal spikes within a predetermined time interval (or alternatively, the number of zero crossings) to generate a vibration frequency measurement. Where such measurements are made in response to a time interval, an interval such as approximately 8 ms (or a sample rate of approximately 125 Hz), may conveniently be used. Alternatively, a portion of the vibration response spectrum, representing a response during a selected time interval, may be modeled in subjected to a Fourier transformation to provide an estimate of the speed. Additional explanations of various methods for determining speed of an input device from vibration measurements may be found in U.S. patent application Ser. No. 12/235,326, filed Sep. 22, 2008, and entitled "Using Vibration to Determine the Motion of an Input Device;" and U.S. patent application Ser. No. 12/182,799, filed Jul. 30, 2008, and entitled "Velocity Stabilization for Accelerometer Based Input Devices;" each of which is assigned to the assignee of the present application; and each of which is incorporated herein by reference for all purposes.

The speed signal and the direction vector will then be used to determine a positioning signal 710, and then to generate a position signal output 712. The position signal may, for example, include incremental input device coordinates (ΔX, ΔY) which are then processed in a conventional manner to provide updated coordinates for a cursor relative to pixels on a display screen. The signal output may then be communicated through a conventional connection, such as may be provided through a USB link, to the processing system with which the input device is being used. The processing system will then typically implement suitable drivers to translate incremental input device coordinates (ΔX, ΔY) and/or any other portions of the position signal output into incremental movement along pixels of the display device.

An alternative implementation of a processing algorithm may be used wherein no direction vector is directly determined, but wherein the X and Y deflection signals are combined directly with the speed signal to generate a positioning signal. For example, one way of performing such combination is to multiply each of the X and Y deflection signals by the magnitude of the speed measurement, to generate the incremental input device coordinates (ΔX, ΔY).

There are many additional alternative constructions that may be envisioned to those skilled in the art having the benefit of the teachings of this disclosure. For example, force sensor assembly 300 of FIGS. 3-5 depicts flexure elements achieved through flex bands, which deflect in response to applied force, and then return to essentially their original position and state. Force sensor assembly 600 of FIG. 6 depicts a flexible member which suspends a structural member through flexible elements to facilitate the necessary displacement in response to applied force. However, alternative flexible yet resilient interconnections may be envisioned. For example, FIG. 8 depicts a connection 800 as might be implemented between two structural members 802, 804 through placement of a resilient elastomeric element 806 between the two members. Such elastomeric element could be formed, as just one example, by a resilient silicone compound. In the depicted connection 800, the structural members are configured with complementary extending lips 808, 810 that embrace opposite sides of elastomeric element 806. However, where elastomeric element 806 would be formed through a material that either had adhesive properties or could be used in combination with an appropriate adhesive, such lips would not be required; and a resilient connection could be established just through just the adhesive coupling between the two structural members, conceivably between purely planar portions of such structural members.

Many additional modifications and variations may be made in the techniques and structures described and illustrated herein. For example, for any of the described force sensor assemblies, even those restricted to motion that is generally restricted to just two axes, it could be desirable to use additional deflection measurement sensors. For example, depending upon the ability of the input device exterior components (such as base 302 and outer shell 304 of FIG. 3), to resist uneven deflection, such as yaw (rotating relative to a vertical axis extending through the input device), it could be desirable to have an additional pair of deflection sensors proximate opposite ends of the force sensor assembly. In such configuration, the measurements from the sensors can be averaged or otherwise referenced with one another to optimize the accuracy of the measurement in the direction to which the sensors are responsive to an applied force. Additionally, a speed signal could be generated by alternative structures, including mechanical contact sensors, optical sensors, etc. Additionally, other systems than the capacitance sensors described herein may be used for determining the relative movement between components. Examples of systems that could be used in place of electrically-based systems are distance sensing mechanisms based on light (such as laser systems), sound (such as ultrasonic sensors), or pressure (such as piezoelectric systems). Accordingly the scope of the invention should be expressly understood to be limited only by the scope of the claims that are supported by the present specification, as well as all equivalents of such claims.

We claim:

1. A force sensor configured for use in an input device to a processing system, comprising:
a first support member;
a second support member coupled in movable relation to the first support member along at least a first axis;
a third support member coupled in movable relation to the second support member along at least a second axis orthogonal to the first axis;
a first sensor arranged to provide a first signal reflective of the degree of movement between the first and second support members relative to at least the first axis; and
a second sensor arranged to provide a second signal reflective of the degree of movement between the second and third support members relative to at least the second axis;
wherein the first and second support members are coupled in movable relation through a first flexure assembly extending between the first support member and the second support member; further comprising:

a second flexure assembly; and a third flexure assembly extending between the first support member and the second support member, the third flexure assembly in spaced relation to the first flexure assembly; and wherein the first and third flexure assemblies each comprise a generally planar flex element, and wherein the two flex elements extend in generally parallel planes to one another.

2. The force sensor of claim 1, wherein the second and third support members are coupled in movable relation through the second flexure assembly extending between the second support member and the third support member.

3. The force sensor of claim 1, wherein the first flexure assembly extending between the first and second support members comprises a flexible metal plate extending in a plane generally perpendicular to the first axis.

4. The force sensor of claim 1, wherein the input device comprises a hand-operated input device.

5. The force sensor of claim 1, wherein the input device comprises a computer mouse.

6. The force sensor of claim 1, wherein at least one of the first flexure assembly, the second flexure assembly, or the third flexure assembly comprises a flexible elastomer.

7. The force sensor of claim 6, wherein the flexible elastomer comprises a silicon-based elastomer.

8. The force sensor of claim 1, wherein at least one of the first flexure assembly, the second flexure assembly, or the third flexure assembly comprises a flexible metal.

9. The force sensor of claim 1, wherein at least one of the first flexure assembly, the second flexure assembly, or the third flexure assembly comprises a flexible plastic.

10. The force sensor of claim 1, wherein at least one of the first support member, the second support member, or the third support member comprises a rigid metal.

11. The force sensor of claim 1, wherein at least one of the first support member, the second support member, or the third support member comprises a rigid glass-filled plastic.

12. An input device, comprising:

a first support wing including, a first central web portion, and angled arms extending generally in a first direction relative to the central web portion;

a second support wing including, a second central web portion, a first pair of angled arms extending generally in a second direction relative to the central web portion, the second direction generally opposite to the first direction; and a second pair of angled arms extending in generally the first direction relative to the central web portion, the second pair of angled arms extending generally orthogonally to the first pair of arms;

front and rear flex plates coupling the first and second support wings to one another through the angled arms, the front and rear flex plates extending in spaced, generally parallel, relation to one another, wherein the support wing having the lowermost web portion has its angled arms coupled to the relatively upper end of each flex plate, and wherein the support wing having the uppermost web portion has its angled arms coupled to the relatively lower end of each flex plate;

a third support wing having a third central web portion, and angled arms extending generally in the second direction relative to the central web portion;

left and right flex plates coupling the second and third support wings to one another through the angled arms, the left and right flex plates extending in spaced, generally parallel, relation to one another, wherein the support wing having the lowermost web portion has its angled arms coupled to the relatively upper end of each flex plate, and wherein the support wing having the uppermost web portion has its angled arms coupled to the relatively lower end of each flex plate;

a first sensor assembly having a first component supported by the first support wing and a second component carried by the second support wing, and configured to provide a first signal reflective of the degree of movement between the first and second support wings relative to at least the first axis; and a second sensor assembly having a first component supported by the second support wing and a second component carried by the third support wing, and configured to provide a first signal reflective of the degree of movement between the second and third support wings relative to at least the second axis.

13. The input device of claim 12, wherein the input device comprises a computer mouse.

14. The input device of claim 12, wherein the input device comprises a hand-operated input device.

15. The input device of claim 12, wherein at least one of the front and rear flex plates or the left and right flex plates comprise a flexible elastomer.

16. The input device of claim 15, wherein the flexible elastomer comprises a silicon-based elastomer.

17. The input device of claim 12, wherein at least one of the first the front and rear flex plates or the left and right flex plates comprise a flexible metal.

18. The input device of claim 12, wherein at least one of the first the front and rear flex plates or the left and right flex plates comprise a flexible plastic.

19. The input device of claim 12, wherein at least one of the first support wing or the second support wing comprises a rigid glass-filled plastic.

20. The input device of claim 12, wherein at least one of the first support wing or the second support wing comprises a rigid metal.

* * * * *